US012618608B2

(12) United States Patent
Wan et al.

(10) Patent No.: US 12,618,608 B2
(45) Date of Patent: May 5, 2026

(54) COMPRESSOR BIN AND REFRIGERATION APPARATUS HAVING THE SAME

(71) Applicants: CHONGQING HAIER REFRIGERATION ELECTRIC APPLIANCE CO., LTD., Chongqing (CN); QINGDAO HAIER REFRIGERATOR CO., LTD, Qingdao (CN); HAIER SMART HOME CO., LTD., Qingdao (CN)

(72) Inventors: Yanbin Wan, Qingdao (CN); Jianquan Chen, Qingdao (CN); Peng Lv, Qingdao (CN); Haijuan Wang, Qingdao (CN)

(73) Assignees: CHONGQING HAIER REFRIGERATION ELECTRIC APPLIANCE CO., LTD.;, Chongqing (CN); QINGDAO HAIER REFRIGERATOR CO., LTD;, Qingdao (CN); HAIER SMART HOME CO., LTD., Qingdao (CN)

( * ) Notice: Subject to any disclaimer, the term of this patent is extended or adjusted under 35 U.S.C. 154(b) by 252 days.

(21) Appl. No.: 18/557,735

(22) PCT Filed: Jan. 14, 2022

(86) PCT No.: PCT/CN2022/071989
§ 371 (c)(1),
(2) Date: Oct. 27, 2023

(87) PCT Pub. No.: WO2022/227712
PCT Pub. Date: Nov. 3, 2022

(65) Prior Publication Data
US 2024/0210095 A1 Jun. 27, 2024

(30) Foreign Application Priority Data
Apr. 28, 2021 (CN) ......................... 202120903583.4

(51) Int. Cl.
*F25D 23/00* (2006.01)
*G10K 11/16* (2006.01)

(52) U.S. Cl.
CPC .......... *F25D 23/003* (2013.01); *G10K 11/161* (2013.01)

(58) Field of Classification Search
CPC .............. F04B 39/0061; F04B 39/0066; F25B 2500/12; F25B 2500/13; G10K 11/161;
(Continued)

(56) References Cited

U.S. PATENT DOCUMENTS

2014/0007612 A1* 1/2014 Kim ...................... F28D 1/0478 165/104.11
2020/0348071 A1* 11/2020 Yang ....................... F25D 23/10
(Continued)

FOREIGN PATENT DOCUMENTS

CN 107514858 A 12/2017
CN 108444168 A * 8/2018 .............. F25D 11/00
(Continued)

OTHER PUBLICATIONS

English translation of CN 209875570U, accessed Aug. 27, 2025 via Espacenet, <https://translationportal.epo.org/emtp/translate/?ACTION=description-retrieval&COUNTRY=CN&ENGINE=google&FORMAT=docdb&KIND=U&LOCALE=en_EP&NUMBER=209875570&SRCLANG=zh&TRGLANG=en> (Year: 2019).*

*Primary Examiner* — Jeremy A Luks
(74) *Attorney, Agent, or Firm* — MUNCY, GEISSLER, OLDS & LOWE, P.C.

(57) ABSTRACT

The present utility model discloses a compressor bin and a refrigeration apparatus having the same; when a sound in the compressor bin reaches a silencing channel of a silencing device along an air supply channel, the sound enters a silencing cavity, which prolongs a propagation path of the
(Continued)

sound, reduces energy of the sound, and reduces the continuously emitted sound, such that a noise generated by the refrigerator is reduced, normal venting and heat dissipation in the compressor bin are not influenced, and a good noise reduction effect is achieved while normal operation of the refrigerator is guaranteed.

8 Claims, 5 Drawing Sheets

(58) Field of Classification Search
CPC . F25D 17/065; F25D 2317/067; F25D 23/003
USPC .......................................................... 181/229
See application file for complete search history.

(56) References Cited

U.S. PATENT DOCUMENTS

| | | | | |
|---|---|---|---|---|
| 2023/0162716 | A1 * | 5/2023 | Maeta | F02B 77/13 181/224 |
| 2024/0060513 | A1 * | 2/2024 | Wan | F04D 29/665 |
| 2024/0210095 | A1 * | 6/2024 | Wan | F25D 23/003 |

FOREIGN PATENT DOCUMENTS

| | | | | | |
|---|---|---|---|---|---|
| CN | 109708385 | A | * | 5/2019 | |
| CN | 109708388 | A | | 5/2019 | |
| CN | 209875570 | U | | 12/2019 | |
| CN | 111622990 | A | | 9/2020 | |
| CN | 111811192 | A | | 10/2020 | |
| CN | 111853966 | A | | 10/2020 | |
| CN | 112233637 | A | * | 1/2021 | F24H 9/0005 |
| EP | 3764034 | A1 | | 1/2021 | |
| JP | 2911236 | B2 | * | 6/1999 | |

* cited by examiner

COMPRESSOR BIN AND REFRIGERATION APPARATUS HAVING THE SAME

TECHNICAL FIELD

The present utility model relates to a compressor bin and a refrigeration apparatus having the same, and pertains to the field of household appliance technologies.

BACKGROUND

A refrigerator may generate noises during operation, a main source of the noises is a compressor in a compressor bin, vibrations of the compressor are radiated out through the compressor bin, and during operation, the compressor may produce heat while generating continuous noises, and therefore, heat dissipation is required to be performed on the compressor to guarantee normal work thereof. Therefore, a channel of the compressor bin communicated with the outside is necessary, and the noise generated by the compressor is also transmitted to the outside through the channel, such that the noise around the refrigerator is difficult to suppress, thus influencing use experiences of a user.

SUMMARY

In order to solve a problem in a prior art, an object of the present utility model is to provide a compressor bin and a refrigeration apparatus having the same.

To achieve the above object of the utility model, an embodiment of the present utility model provides a compressor bin, comprising an inner wall enclosing an air supply channel, wherein the compressor bin further comprises a silencing device, and the silencing device comprises a silencing body, a silencing channel penetrating through the silencing body and a plurality of silencing cavities arranged in the silencing body; a plurality of silencing devices abutting against the inner wall are arranged along an extending direction of the air supply channel, the silencing channel is communicated with the air supply channels on two sides of the silencing device, and the silencing cavity comprises an opening facing the silencing channel.

As a further improvement of the present utility model, the silencing device is hermetically connected with a circumference of the inner wall along a vertical plane perpendicular to the extending direction of the air supply channel;

the air supply channel is arranged in a left-right direction, the compressor bin comprises side walls arranged on a left side and a right side, and vents are arranged on the side walls.

As a further improvement of the present utility model, ports for passing air flow are provided on two sides of the silencing channel, and the ports are flush with the vents.

As a further improvement of the present utility model, the compressor bin comprises a fan and at least one silencing device is provided between the fan and the vent adjacent to the fan.

As a further improvement of the present utility model, the fan is configured as an axial flow fan, ports for passing air flow are provided on two sides of the silencing channel, and an extending direction of an axis of the axial flow fan passes through the ports.

As a further improvement of the present utility model, the compressor bin comprises a compressor, and at least one silencing device is provided between the compressor and the vent adjacent to the compressor.

As a further improvement of the present utility model, the silencing device further comprises a hermetical connection layer provided between the silencing body and the inner wall.

As a further improvement of the present utility model, the silencing device comprises a silencing pedestal for heightening the silencing body, the compressor bin comprises a support bottom plate, the silencing pedestal is fixed to the support bottom plate, and the silencing body is fixed to the silencing pedestal;

the silencing pedestal is slidably inserted into the support bottom plate.

As a further improvement of the present utility model, at least two of the silencing cavities have different volumes.

To achieve the above object of the utility model, an embodiment of the present utility model provides a refrigeration apparatus, comprising the above compressor bin.

Compared with the prior art, the present utility model has the following beneficial effects: when a sound in the compressor bin reaches a silencing channel of a silencing device along an air supply channel, the sound enters a silencing cavity, which prolongs a propagation path of the sound, reduces energy of the sound, and reduces the continuously emitted sound, such that a noise generated by the refrigerator is reduced, normal venting and heat dissipation in the compressor bin are not influenced, and a good noise reduction effect is achieved while normal operation of the refrigerator is guaranteed.

Figure 1:
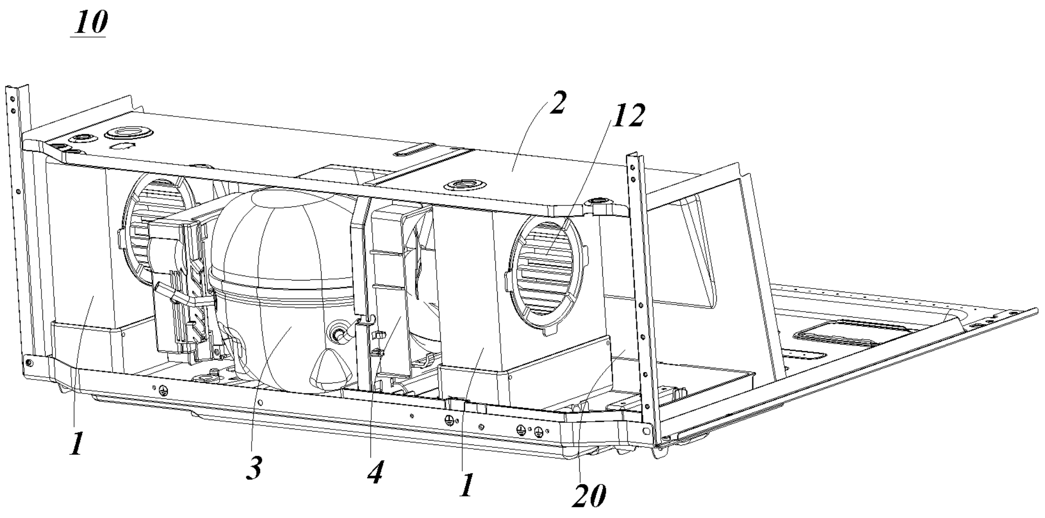
FIG. 1 is a schematic structural diagram of a compressor bin with a rear cover plate removed from a certain perspective according to an embodiment of the present utility model.

In the drawings: 100. refrigeration apparatus; 10. compressor bin; 1. silencing device; 11. silencing body; 12. silencing channel; 13. silencing cavity; 131. opening; 14. silencing pedestal; 2. inner wall; 20. air supply channel; 21. support bottom plate; 3. compressor; 4. fan; 5. side wall; 6. vent.

DETAILED DESCRIPTION

Hereinafter, the present utility model will be described in detail in conjunction with specific embodiments shown in the accompanying drawings. However, these embodiments have no limitations on the present utility model, and any transformations of structure, method, or function made by persons skilled in the art according to these embodiments fall within the protection scope of the present utility model.

It should be understood that the terms expressive of spatial relative positions, such as “upper”, “above”, “lower”, “below”, or the like herein are used to describe the relationship of a unit or feature relative to another unit or feature in the drawings, for illustration and description. Terms expressive of the spatial relative positions are intended to include different orientations of the device in use or operation other than the orientations shown in the drawings.

Figure 4:
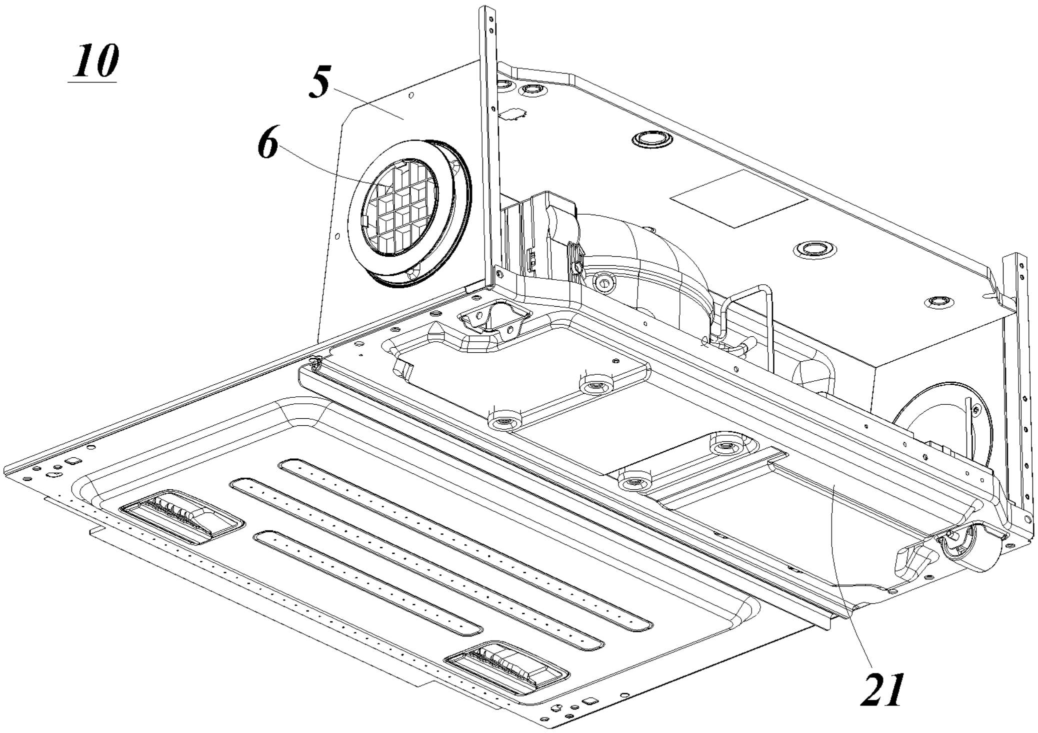
FIG. 4 is a schematic structural diagram of the compressor bin with the rear cover plate removed from another perspective according to the embodiment of the present utility model.

An embodiment of the present utility model provides a compressor bin and a refrigeration apparatus having the same, and the compressor bin emits a small noise outwards. The compressor bin is shown in FIG. 1 or 4, and the refrigeration apparatus is shown in FIG. 5.

Figure 5:
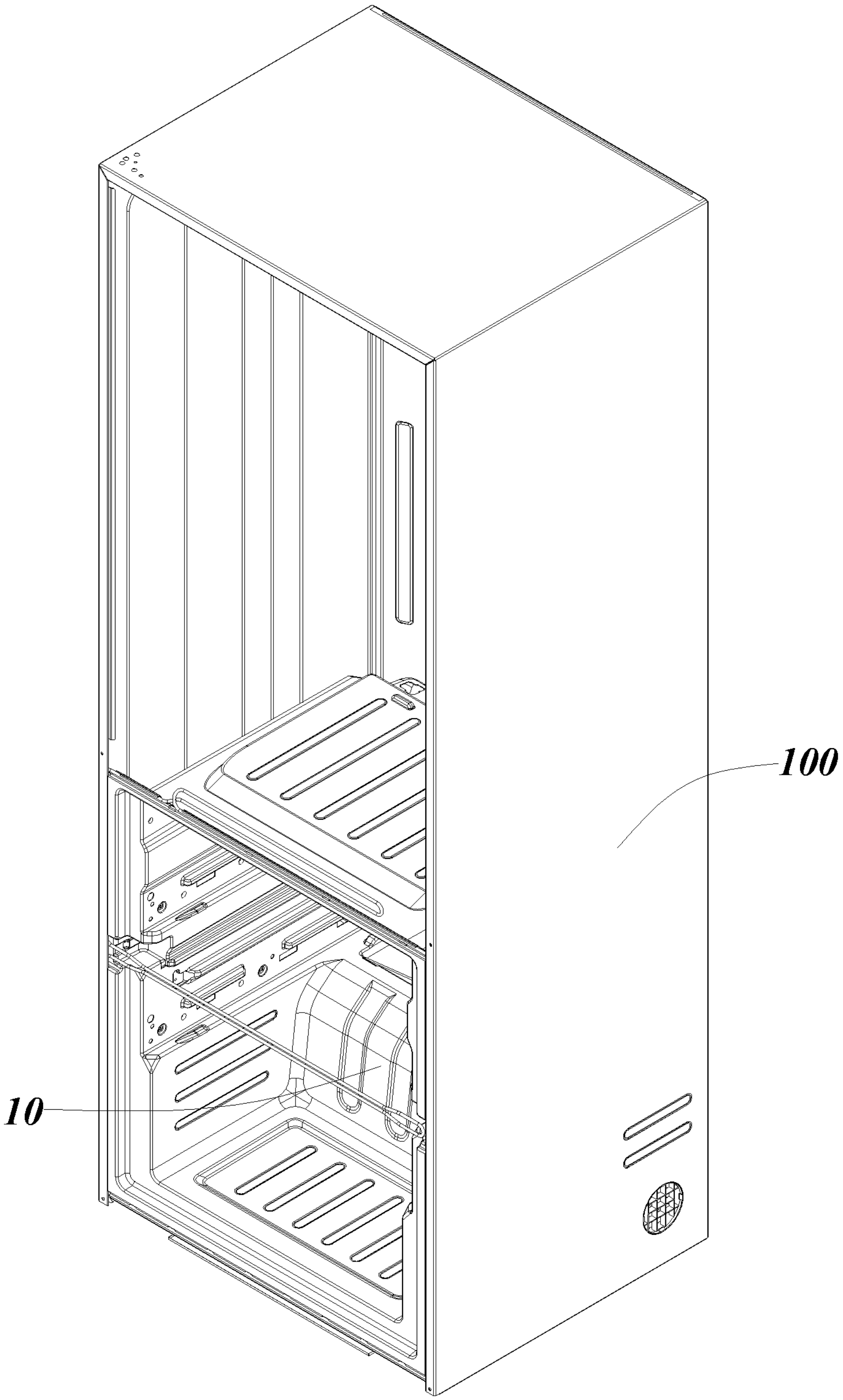
FIG. 5 is a schematic structural diagram of a refrigeration apparatus according to an embodiment of the present utility model.

The refrigeration apparatus according to the present embodiment may be configured as a refrigerator, a refrigeration system is provided inside the refrigerator, the refrigeration system has a circulation loop for circulating a refrigerant, the refrigeration system includes a compressor, a condenser, a throttling pipeline and an evaporator connected in series in sequence, at least the compressor is provided in the compressor bin, the compressor bin may be located at any position of the refrigerator, such as a bottom, a middle and a top, and the compressor bin of FIG. 5 according to the present embodiment is located at the bottom of the refrigerator.

In the present embodiment, the noise radiated outwards from the compressor bin is improved to solve a noise problem in a prior art.

To clearly express the position and direction described in the present embodiment, in the present embodiment, the up-down direction can be defined by substantially referring to the direction of gravity when the refrigerator is placed on a horizontal floor, and since the compressor bin is provided inside the refrigerator, the direction from the back of the refrigerator towards the refrigerator cabinet serves as the rear, the rear of the refrigerator serves as the front, and both sides perpendicular to the front-rear direction serve as the left and right.

The compressor bin according to the present embodiment includes an inner wall enclosing an air supply channel, air enters the air supply channel from one side and exits from the air supply channel from the other side, a fan, the condenser and the compressor are sequentially arranged in the compressor bin in a left-right direction, air flow blows leftwards or rightwards, the inner wall includes an upper top wall, a lower support bottom plate, a rear back plate and a front refrigerator back plate, and the inner wall encloses the air supply channel with a substantially trapezoidal cross section.

The compressor bin further includes a silencing device, and the silencing device includes a silencing body, a silencing channel penetrating through the silencing body and a plurality of silencing cavities arranged in the silencing body; a plurality of silencing devices abutting against the inner wall are arranged along an extending direction of the air supply channel, the silencing channel is communicated with the air supply channels on two sides of the silencing device, and the silencing cavity includes an opening facing the silencing channel. When the air flow flows in the air supply channel, the air flow passes through the silencing channel of the silencing device and then enters the silencing cavity to reduce the outward diffused noise. The silencing device can be provided at a reasonable position according to a position arrangement in the compressor bin.

The silencing device having such an arrangement may be provided at any position in the compressor bin, such that the specific position of the silencing device can be conveniently and reasonably arranged according to a space in the compressor bin, and flexibility is high; the compressor bin certainly has therein air flow which passes through the silencing channel, and a noise reduction effect is achieved when the air flow passes through the silencing channel. For refrigerators with different models, the silencing device can be experimentally fixed at different positions to detect the noise reduction effect, so as to determine the specific mounting position of the silencing device; since a silencing structure is modularized, the specific mounting position may be reasonably debugged after production, thereby facilitating production and generalization in refrigerators with various sizes.

Further, the silencing device is hermetically connected with the inner wall around its entire circumference along a vertical plane perpendicular to the extending direction of the air supply channel; that is, when passing through the position of the silencing device, the air flow can only pass through the silencing channel, and cannot pass through other positions, such as a gap between the silencing device and the inner wall; that is, the silencing device is hermetically connected with the upper top wall, the lower support bottom plate, the rear back plate and the front refrigerator back plate. The silencing device further includes a hermetical connection layer provided between the silencing body and the inner wall. The hermetical connection layer can be made of sealing materials, such as sealing glue, foamed cotton, silica gel, rubber, or the like, and can be pre-mounted on the inner wall or fixed on the silencing body. Therefore, the air flow can be guaranteed to reach the other side only through the silencing channel, thus enhancing the noise reduction effect.

The air supply channel is arranged in the left-right direction, the compressor bin includes side walls arranged on left and right sides, vents are arranged on the side walls, the vent on one side is configured as an air inlet, the vent on the other side is configured as an air outlet, and the vents can be circular and be provided with protective covers for preventing animals from entering the compressor bin.

Ports for passing the air flow are provided on two sides of the silencing channel and are flush with the vents, such that the air flow can conveniently and directly blow from the vents after passing through the silencing channel.

At least one silencing device is provided between the fan and the vent adjacent to the fan, the fan is configured as an axial flow fan, ports for passing the air flow are provided on two sides of the silencing channel, and an extending direction of an axis of the axial flow fan passes through the ports. The fan can conveniently drive the air flow to flow among the fan, the port and the vent; when the fan radiates a noise outwards, the noise has to pass through the silencing channel when reaching the vent closest to the fan, thereby achieving an effect of noise reduction at a position closer to a sound source, and avoiding that flowing of the air flow is blocked during noise reduction.

Further, at least one silencing device is provided between the compressor and the vent adjacent to the compressor. When the compressor radiates a noise outwards, the noise has to pass through the silencing channel when reaching the vent closest to the compressor, thereby achieving an effect of noise reduction at a position closer to a sound source.

Figure 2:
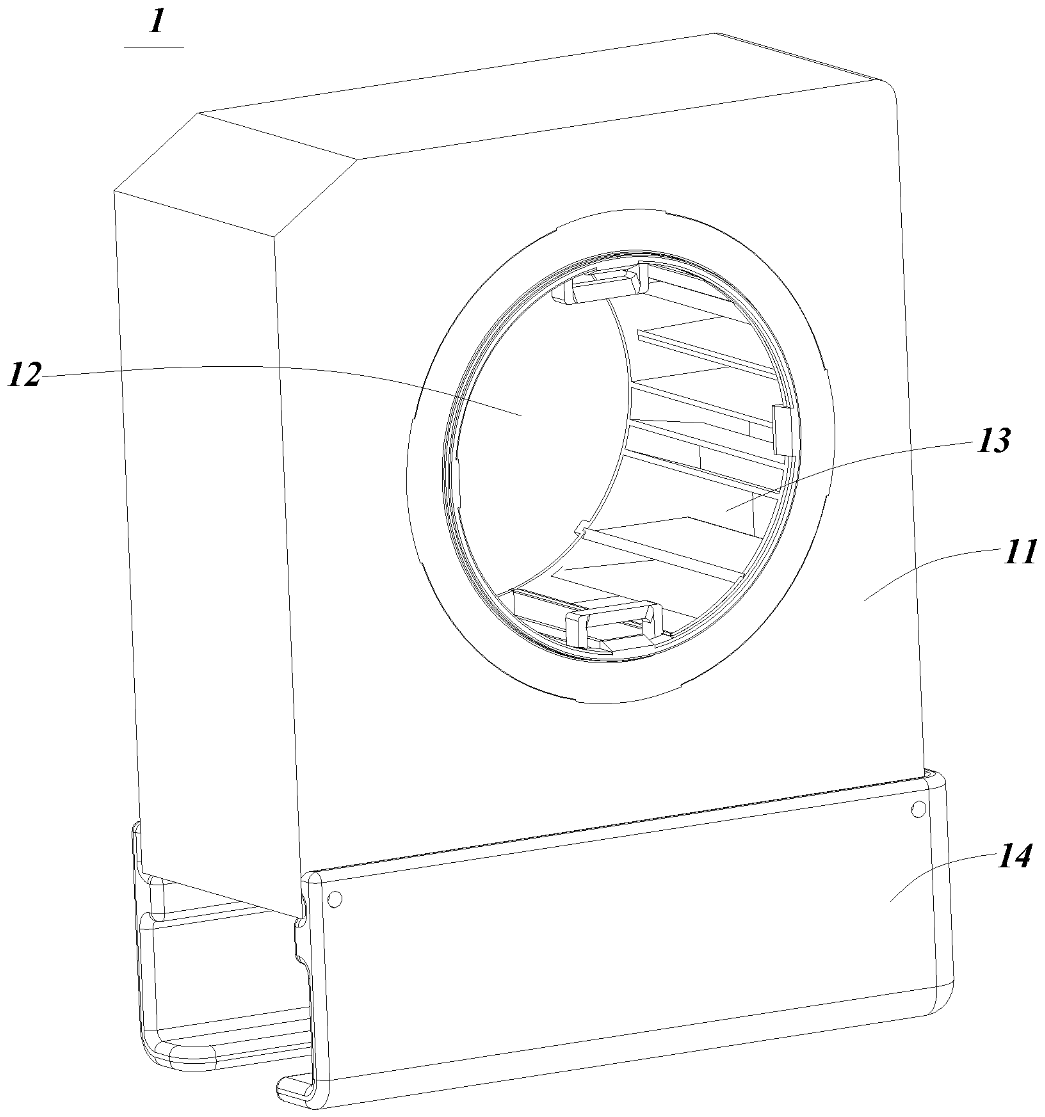
FIG. 2 is a schematic structural diagram of a silencing device in the embodiment of the present utility model.
Figure 3:
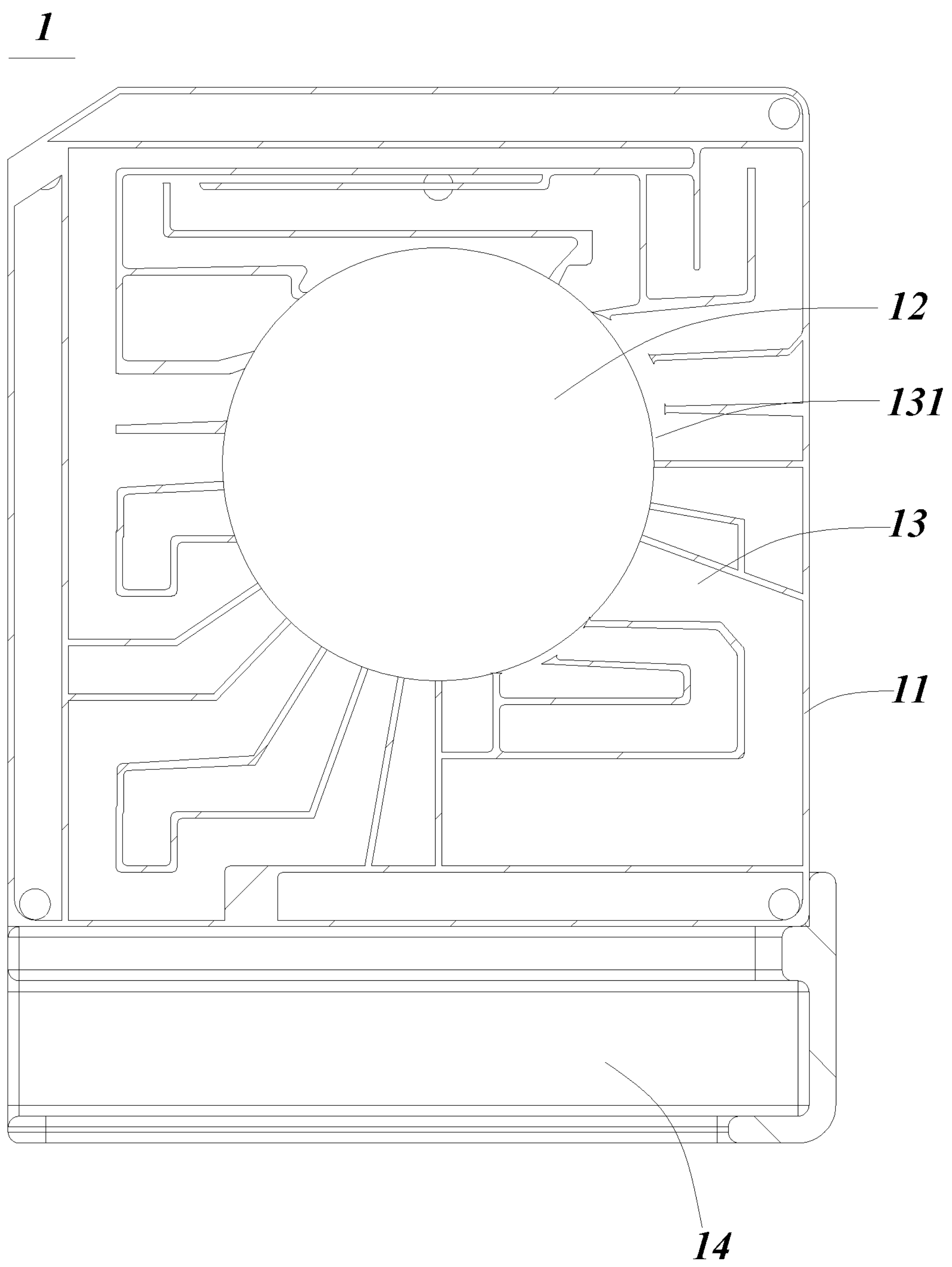
FIG. 3 is a sectional view of the silencing device in the embodiment of the present utility model.

The silencing device includes a silencing pedestal for heightening the silencing body, and as shown in FIGS. 1 to 3, the compressor bin includes the support bottom plate, the silencing pedestal is fixed to the support bottom plate, and the silencing body is fixed to the silencing pedestal; the silencing pedestal is slidably inserted into the support bottom plate. By providing the silencing pedestal for heightening, the silencing device may be stably fixed, and the silencing channel may be heightened to a target position; the support bottom plate may be provided with a sliding groove, and the silencing pedestal is slidably inserted into the sliding groove, thereby facilitating rapid assembly and disassembly.

Further, at least two silencing cavities have different volumes, as shown in FIG. 2 or 3, thus increasing a propagation path of the sound, reducing energy of the sound radiated outwards, and achieving the noise reduction effect; the volume of the silencing cavity can determine a frequency range of the sound capable of being eliminated by the silencing cavity, different silencing cavities have different silencing frequency ranges, and therefore, by adjusting the volumes of different silencing cavities, the noises with different frequencies may be eliminated when the sound enters different silencing cavities, such that the silencing device has wider silencing frequencies.

Compared with the prior art, the present embodiment has the following beneficial effects:

When a sound in the compressor bin reaches a silencing channel of a silencing device along an air supply channel, the sound enters a silencing cavity, which prolongs a propagation path of the sound, reduces energy of the sound, and reduces the continuously emitted sound, such that a noise generated by the refrigerator is reduced, normal venting and heat dissipation in the compressor bin are not influenced, and a good noise reduction effect is achieved while normal operation of the refrigerator is guaranteed.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present utility model, and is not intended to limit the protection scope of the present utility model. Equivalent embodiments or modifications made within the spirit of the present utility model shall fall within the protection scope of the present utility model.

What is claimed is:

1. A compressor bin, comprising an inner wall enclosing an air supply channel, wherein the compressor bin further comprises a plurality of silencing devices, and each silencing device comprises a silencing body, a silencing channel penetrating through the silencing body and a plurality of silencing cavities arranged in the silencing body; a plurality of silencing devices abutting against the inner wall are arranged along an extending direction of the air supply channel, the silencing channel of each silencing device is communicated with the air supply channels on two sides of the respective silencing device, and each silencing cavity comprises an opening facing the silencing channel;

the air supply channel is arranged in a left-right direction, the compressor bin comprises side walls arranged on a left side and a right side, and vents are arranged on the side walls;

the inner wall includes an upper top wall, a lower support bottom plate, a rear back plate and a front refrigerator back plate, each silencing device is hermetically connected with the upper top wall, the lower support bottom plate, the rear back plate and the front refrigerator back plate along a vertical plane perpendicular to the extending direction of the air supply channel;

ports for passing air flow are provided on two sides of the silencing channel of the respective silencing device, and the ports are flush with the vents.

2. The compressor bin according to claim 1, wherein the compressor bin comprises a fan and at least one silencing device is provided between the fan and the vent adjacent to the fan.

3. The compressor bin according to claim 2, wherein the fan is configured as an axial flow fan, ports for passing air flow are provided on two sides of the silencing channel, and an extending direction of an axis of the axial flow fan passes through the ports.

4. The compressor bin according to claim 1, wherein the compressor bin comprises a compressor, and at least one silencing device is provided between the compressor and the vent adjacent to the compressor.

5. The compressor bin according to claim 1, wherein each silencing device further comprises a hermetical connection layer provided between the silencing body and the inner wall.

6. The compressor bin according to claim 1, wherein each silencing device comprises a silencing pedestal for heightening the silencing body, the compressor bin comprises a support bottom plate, the silencing pedestal is fixed to the support bottom plate, and the silencing body is fixed to the silencing pedestal;

the silencing pedestal is slidably inserted into the support bottom plate.

7. The compressor bin according to claim 1, wherein at least two of the silencing cavities have different volumes.

8. A refrigeration apparatus, comprising the compressor bin according to claim 1.

* * * * *